No. 628,478. Patented July 11, 1899.
H. KÜHNE.
APPARATUS FOR MEASURING AIR CURRENTS, &c.
(Application filed Dec. 1, 1897.)
(No Model.) 2 Sheets—Sheet 2.
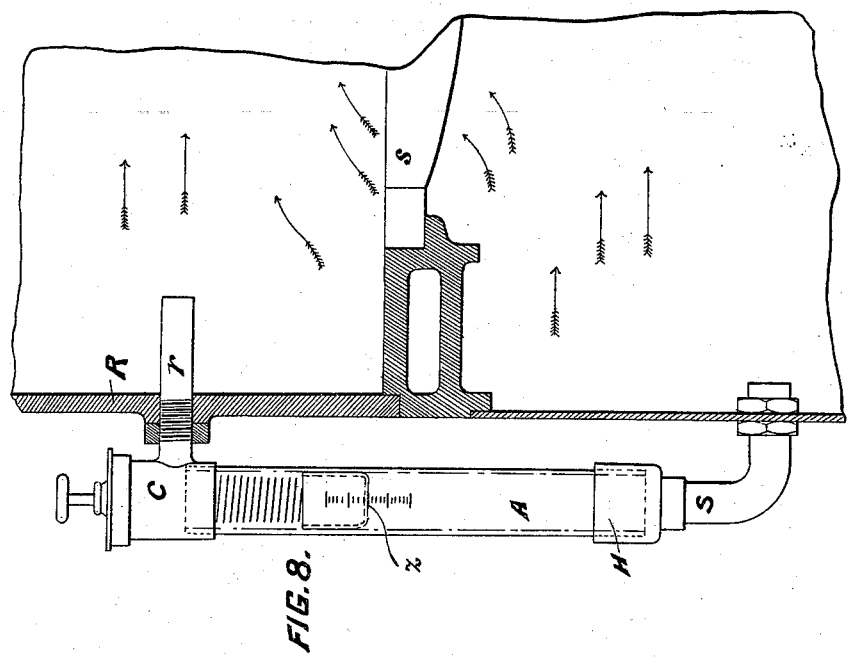
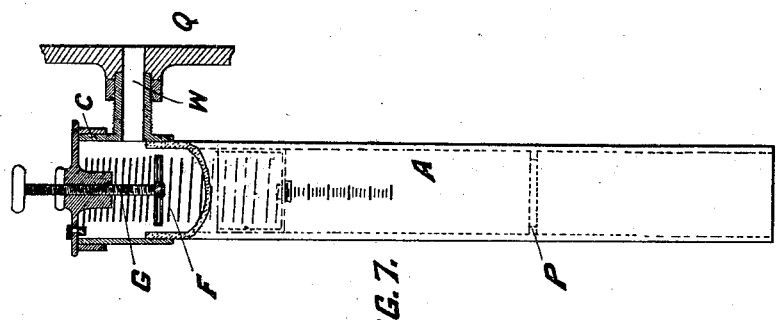
Witnesses: Inventor:
Hermann Kühne
By
his Attorneys

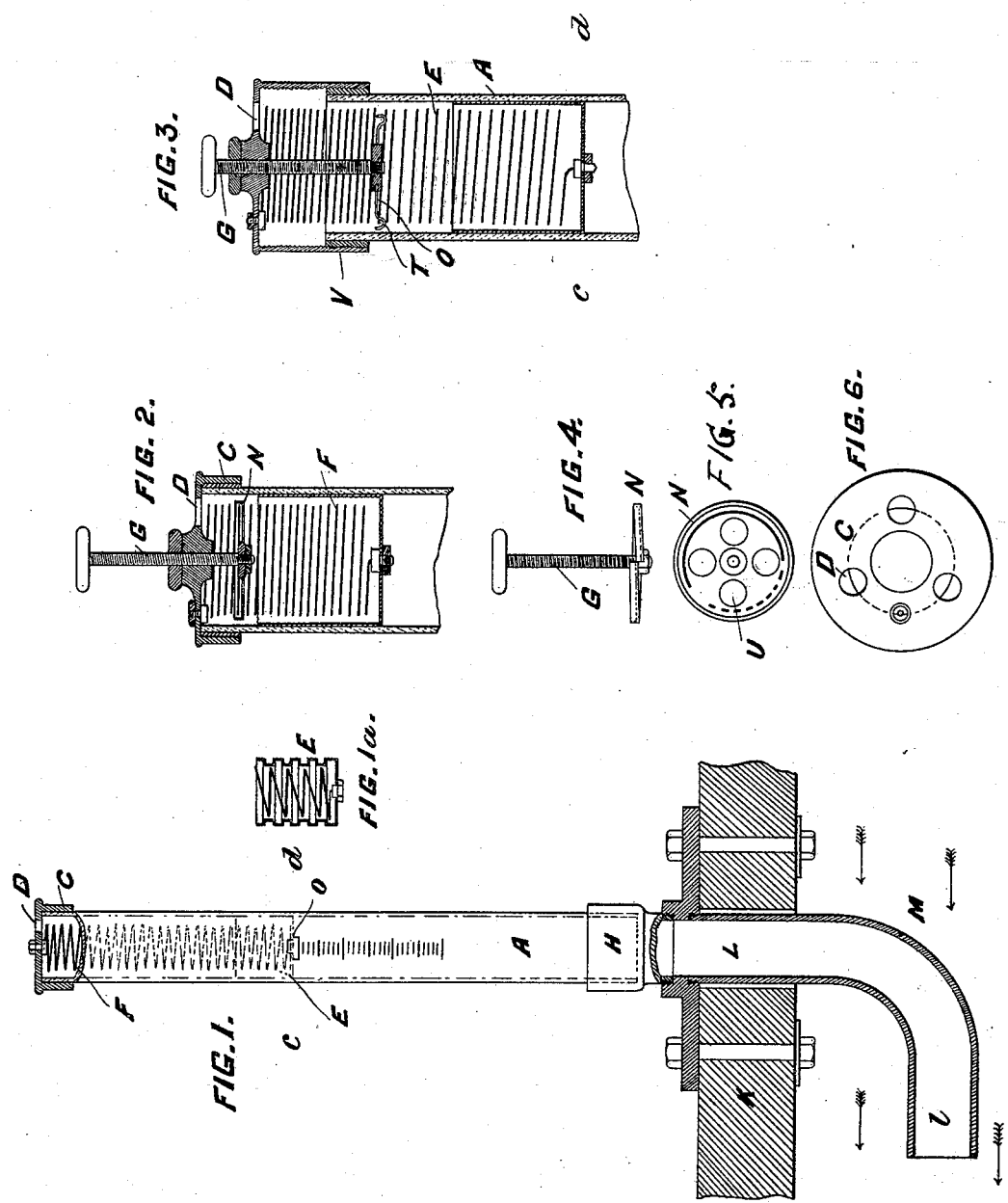

UNITED STATES PATENT OFFICE.

HERMANN KÜHNE, OF LONDON, ENGLAND.

APPARATUS FOR MEASURING AIR-CURRENTS, &c.

SPECIFICATION forming part of Letters Patent No. 628,478, dated July 11, 1899.

Application filed December 1, 1897. Serial No. 660,349. (No model.)

*To all whom it may concern:*

Be it known that I, HERMANN KÜHNE, engineer, a citizen of Great Britain, residing at 25 to 35 New Broad street, in the city of London, England, have invented a certain new and useful Apparatus for Measuring the Velocity of Air and other Gas Currents, of which the following is a specification.

My invention is intended to measure the velocity of air and other gas currents in the flues of furnaces, chimneys, and like ducts or passages.

The instrument consists of a cylindrical tube of glass or like transparent material in which a light, well-fitting, bucket-shaped piston is fitted and moves. The glass tube is provided at one or both ends with suitable holders or caps. The piston is suspended by means of an elastic medium, preferably a fine cylindrically-wound spiral spring, to one of the caps. By means of suitable pipe connections the duct in which the current to be measured is contained is connected with one of the caps or holders of the glass tube, while the other end of the glass tube admits the pressure of the atmosphere. A difference of pressure is thus set up on the two sides of the piston, tending to draw the latter in the direction of the smaller pressure against the force of the spring until the tension or resistance of the latter balances the difference in pressure. From the position of the piston within the glass tube the velocity of the current can be read. The piston is constructed of very light material in order that the extension of the spring should as far as possible be caused only by the current and not by the weight of the piston. The piston is therefore preferably made of very thin aluminium or blown glass, and its shape is so arranged as to insure a sufficiently good fit in the glass tube and a parallel motion therein while providing sufficient freedom from friction. These conditions are best fulfilled by giving the piston the shape of a deep cylindrical bucket. The cylindrical part of the bucket is preferably provided with ring-shaped grooves which form an air-packing. Sufficient lightness of the piston, lightness combined with great mobility and parallel guidance, is thereby attained. As an elastic medium for the suspension of the piston a light cylindrically-wound spring of thin steel wire is preferably used, the spring having a slightly-smaller diameter than the inside of the piston or its grooves.

The salient and leading feature of the invention to be hereinafter more particularly described consists in direct or positive reading of the gas-current by the motion of a piston against a spring within a tube of transparent material, such as glass; and by the term "positive or direct reading" is meant the measurement and indication of the said currents without the interposition of clockwork and dials, as in ordinary gages.

The means adopted to carry my invention into effect are illustrated in the accompanying sheets of drawings as follows:

Figure 1 is an elevation, partly in section, of the measuring apparatus, shown in place on an ordinary boiler-flue to indicate the draft. Fig. 1$^a$ is the piston removed from the tube and in section. Fig. 2 is a vertical longitudinal section of a modification of the spring retaining and adjusting device. Fig. 3 is a vertical longitudinal section of a further modification of the spring retaining and adjusting device. Figs. 4 and 5 are respectively side elevation and plan of a portion of the mechanism shown on Fig. 2. Fig. 6 is a plan of the apparatus shown in Fig. 2. Fig. 7 is an elevation, partly in section, of the apparatus modified to measure forced draft. Fig. 8 illustrates the application of the apparatus to measuring differences between two currents of air in a boiler-furnace.

Figs. 1 and 1$^a$ illustrate the salient features of the invention. The transparent tube A, preferably made of glass, is cemented with its lower end into the metal cap H, and this cap is attached to the brickwork K and tube L by a screwed flange and bolts or in any other convenient manner. The tube L is bent and reaches, with its end $l$, into the duct or flue M, containing the current to be measured, and projects in the same direction as the flow of the said current, (indicated by the arrows.) The upper end of the glass tube carries a cap or cover C, having one or more apertures D. The piston E is suspended by the spring F in such a manner that the latter holds the piston in its center, while the spring may be fixed either to the center of the cover C or at a point of its own periphery.

A distinct mark may be put on the piston, or the upper or lower edge of the piston may be used as a mark, and in this modification the lower edge $c\,d$ is so used. When using the apparatus to indicate natural draft, (as in this modification,) the tube is marked with a zero, as shown, and graduated downward to represent vacuum inches of water-pressure, though it is evident that any other suitable readings may be indicated upon the tube. The gases in the flue M, and consequently the air underneath, when the boiler is in operation are rarefied, and the atmospheric pressure therefore elongates the spring until the resistance of the latter is equal to the difference in pressure above and below the piston, and from the position which the edge $c\,d$ thereof assumes the velocity of the current and the vacuum can be read directly against the graduations on the glass. It is advantageous to construct the spring F of such a strength that its own weight, plus that of the piston, just extends the spring slightly when at the zero position, so that the piston E is always floating on the spring, and thus secure the indication of even a very slight current.

Figs. 2, 4, 5, and 6 of the drawings illustrate a modification of the device.

The instrument hereinbefore described would be sufficient for all purposes if the velocity of the currents or draft were constant; but as this is not the case and to obviate the necessity of having different strengths of spring the following construction is adopted, so that any required alteration of the position of the piston in the tube or the tension of the spring F can be effected. For this purpose a hand-screw G is introduced through the cover C, the screw having, preferably, the same pitch as the spring F when the coils of the latter are close together. The end of the screw projecting into the glass tube A carries a round dished disk N, arranged with a spiral circumference of the same pitch as one coil of the spring F. To admit the free passage of the air above the piston E, the disk has several apertures U, (clearly shown in plan, Fig. 5,) and the upturned margin of this disk N is interrupted at the point of the termination of its spiral to allow one coil of the spring F to pass. It is evident that a rotation of the hand-screw G will either gather in or release one coil of the spring F, and thus effect the object of this modification—viz., alter the position of the piston in the tube and the spring-tension according to the amount desired.

Fig. 3 is a further modification of the adjusting devices illustrated at Figs. 2, 4, 5, and 6. The disk N is replaced by fixing to the lower end of the screw G spirally-arranged arms O, preferably three in number, having at their ends hooks T, which engage or embrace one coil of the spring, as clearly shown in the drawings. Upon rotating the hand-screw G the coils of the spring are gathered in or released, whereby the strength of the spring and position of the piston are adjusted at will to suit the special requirements of any velocity or current. It is evident that when the zero is cut upon the glass tube and it is found necessary to considerably alter the strength of the spring a further adjustment of the piston in the tube becomes necessary, so that the mark upon the piston or the edge $c\,d$ thereof may be made to coincide with the said zero. For this purpose the cover C is made deep and provided with a screw V, so that the piston E, spring F, and hand-screw G may be raised or lowered together and to the amount required. As an alternative adjustment the scale may be made separate and sliding upon the glass.

Fig. 7 of the drawings illustrates the modification used to measure forced draft. In this case the bottom of the glass tube is open and a suitable stop P to prevent the piston E being blown out of the tube altogether is placed in the position shown. The cover C is closed and has no apertures therein, but is screwed air-tight on the glass tube, and the pressure from the air-duct Q is admitted to the top of the piston by the passage W, the whole apparatus being attached in the manner shown to the side of the duct. The other details are similarly lettered and operate in a similar manner to the modifications hereinbefore described.

Fig. 8 illustrates in sectional elevation the apparatus employed to measure the differences and variations in the pressure above and below the fire-bars in a boiler-furnace where forced draft is employed. In all applications of the instrument described so far it is assumed that artificial pressure is acting on one side of the piston and the natural pressure of the atmosphere on the other. The instrument may, however, also be used to measure the difference between two artificial pressures and in the following manner: The tube A has a closed cap C, as in Fig. 7, and it is attached to the fire-door R to a pipe $r$ projecting within the furnace. The bottom of the tube A is attached to a cap H and a bend S, which projects through the closed space underneath the fire-bars $s$. It is evident that the pressure under the fire-bars $s$ will be greater than that above the fire and that a mark, such as $z$, could be arranged on the tube to indicate the proper difference required, so that the piston would move up when the difference increased, as would occur with undue clinkering in the bars, or move down when the difference decreased, as would occur with the bars improperly covered, and thus indicate the fact to the engineer.

It is to be clearly understood that more than one spring may be used, and that the piston may be made of any suitable substance or form, and that it may also be guided centrally on a wire or rod. Cotton or asbestos or other suitable filters may be applied between the instrument and the currents to exclude dust.

Having now described my invention, what I claim as new, and desire to secure by Letters Patent, is—

1. In an apparatus for measuring the velocity of gases in combination, a tube of transparent material, a piston in the tube, a spring also in the tube against the resistance of which the piston moves, a regulating-screw, a spirally-arranged connection between the screw and the spring said tube being independent of the passage through which the gases pass and having a scale thereon to show the position of the piston and means for connecting the tube with the gas-passage to receive the pressure therefrom at one end, the other end of the tube being also open to pressure, substantially as described.

2. In an apparatus for measuring the velocity of gases in combination; a tube of transparent material connected at one end to the passage in which the gases are moving and at the other end to atmosphere, a piston in the tube moving against the resistance of a spring also contained therein, a perforated cap at the atmospheric side with a regulating-screw carrying a spiral disk to wind the several coils of the spring into or out of action, and a scale upon the tube against which the movements of the piston can be directly read.

3. In an apparatus for measuring the velocity of gases in combination; a tube of transparent material connected at one end to the passage in which the gases are moving and at the other end exposed to pressure, a piston in the tube moving against the resistance of a spring also contained therein, a cap on the tube with a regulating-screw carrying a spiral connection to wind the several coils of the spring into or out of action, and a scale upon the tube against which the movements of the piston can be directly read.

In witness whereof I have hereunto set my hand in presence of two witnesses.

HERMANN KÜHNE.

Witnesses:
ALBERT EDWARD PARKER,
JOS. F. GREENHILL.